United States Patent
Biffle et al.

(10) Patent No.: US 7,730,658 B1
(45) Date of Patent: Jun. 8, 2010

(54) FISHING LURE WITH IMPROVED TAIL

(75) Inventors: Thomas H. Biffle, Wagoner, OK (US); George J. Toalson, Claremore, OK (US)

(73) Assignee: Gene Larew Lures, LLC, Tulsa, OK (US)

( * ) Notice: Subject to any disclaimer, the term of this patent is extended or adjusted under 35 U.S.C. 154(b) by 97 days.

(21) Appl. No.: 12/170,957

(22) Filed: Jul. 10, 2008

(51) Int. Cl.
*A01K 85/00* (2006.01)

(52) U.S. Cl. .................. 43/42.24; 43/42.28; 43/42.23

(58) Field of Classification Search ............... 43/42.24, 43/42.28, 42.23, 42, 42.26
See application file for complete search history.

(56) References Cited

U.S. PATENT DOCUMENTS

| | | | | |
|---|---|---|---|---|
| 1,948,823 | A * | 2/1934 | Lissy | 43/42.13 |
| 2,503,672 | A * | 4/1950 | Johnson et al. | 43/42.28 |
| 2,812,609 | A * | 11/1957 | Lema | 43/42.28 |
| 2,983,065 | A * | 5/1961 | Ferguson et al. | 43/42.09 |
| 3,680,249 | A * | 8/1972 | Chiarenza | 43/42.06 |
| 3,863,378 | A * | 2/1975 | Walker | 43/42.28 |
| 3,979,853 | A | 9/1976 | Storm et al. | |
| 4,044,492 | A * | 8/1977 | Ingram | 43/42.28 |
| 4,138,792 | A | 2/1979 | Hill | |
| 4,530,179 | A | 7/1985 | Larew | |
| 4,592,161 | A | 6/1986 | Smith et al. | |
| 4,653,212 | A | 3/1987 | Pixton | |
| 4,914,850 | A * | 4/1990 | Rice | 43/42.24 |
| 4,926,578 | A | 5/1990 | Morse et al. | |
| 4,953,319 | A * | 9/1990 | Kasper et al. | 43/42.06 |
| 4,998,372 | A * | 3/1991 | Reed | 43/42.24 |
| 5,379,544 | A | 1/1995 | Davidson | |
| 5,465,523 | A | 11/1995 | Garst | |
| 5,956,888 | A * | 9/1999 | Vreeland et al. | 43/42.53 |
| 5,996,271 | A * | 12/1999 | Packer | 43/42.24 |
| 6,138,399 | A | 10/2000 | Wilson | |
| 6,192,616 | B1 | 2/2001 | Kent | |
| 6,301,823 | B1 * | 10/2001 | Monticello et al. | 43/42.5 |
| 6,546,663 | B1 * | 4/2003 | Signitzer et al. | 43/4.5 |
| 7,168,203 | B2 | 1/2007 | Chambers, Sr. | |
| D547,819 | S | 7/2007 | Hollister | |
| 7,266,922 | B2 | 9/2007 | Oelerich, Jr. et al. | |
| D557,761 | S | 12/2007 | Hrvatin | |
| 7,308,773 | B1 | 12/2007 | McNaughton | |
| 2003/0159328 | A1 | 8/2003 | Acker | |
| 2003/0192227 | A1 * | 10/2003 | Stava et al. | 43/42.24 |
| 2005/0028425 | A1 | 2/2005 | Whipple | |
| 2005/0235550 | A1 * | 10/2005 | Oelerich et al. | 43/42.24 |
| 2009/0090041 | A1 * | 4/2009 | Brick | 43/42.47 |

* cited by examiner

*Primary Examiner*—Christopher P Ellis
(74) *Attorney, Agent, or Firm*—Gable Gotwals

(57) ABSTRACT

A soft plastic fishing lure has an integrally formed body and a thin, relatively long, highly flexible tail portion that combine to form a hybrid worm/tube lure. The body portion is a closed-end tubular body and the tail portion is tapered and concave in cross-section along its entire length. The concave cross-sectional area, which generally has a greater thickness of material at its apex than at its lower edge, is effective for capturing water and giving a lifelike appearance to the tail regardless of angler skill or how the lure is rigged, weighted and fished. The fishing lure may be formed so that it has two colors, with one color forming substantially a stripe on the tail portion. Contrasting flakes may be added to either color.

20 Claims, 4 Drawing Sheets

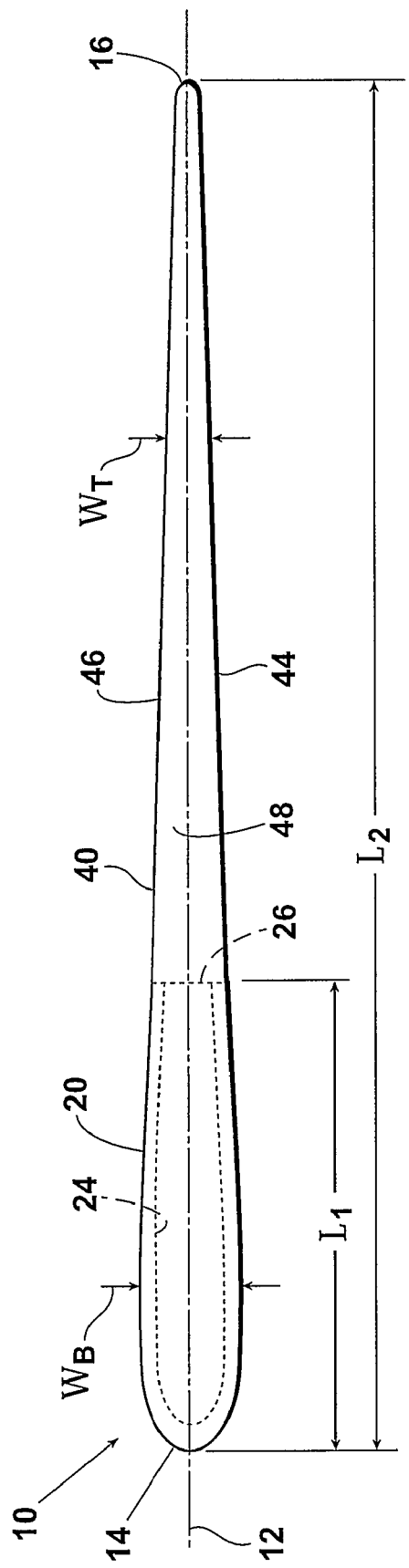
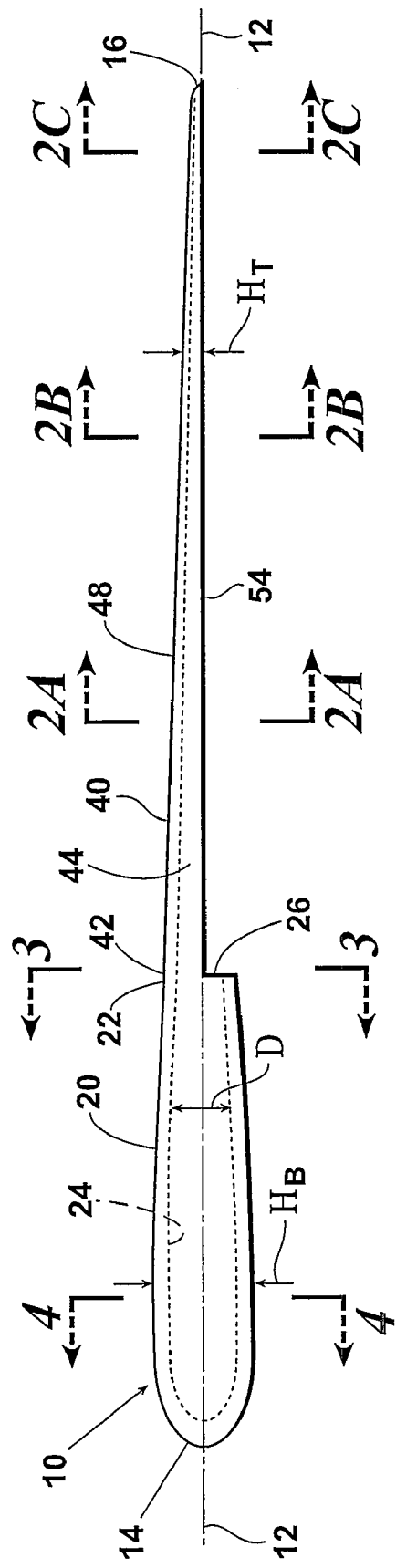
Fig. 1
Fig. 5

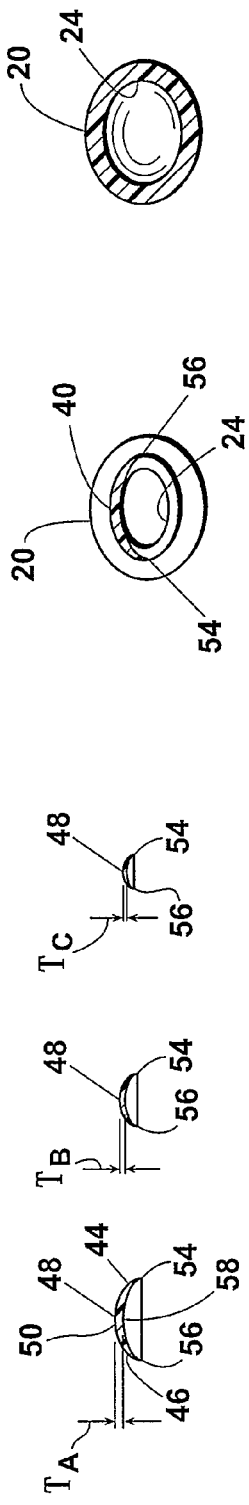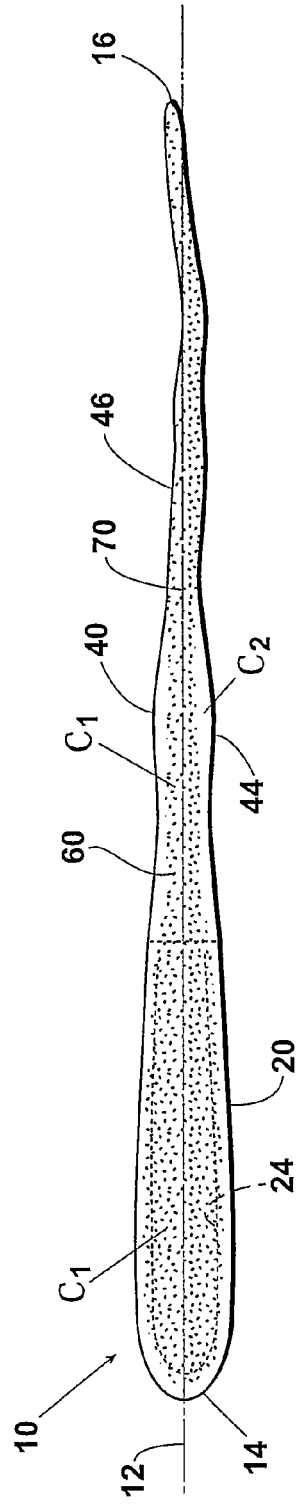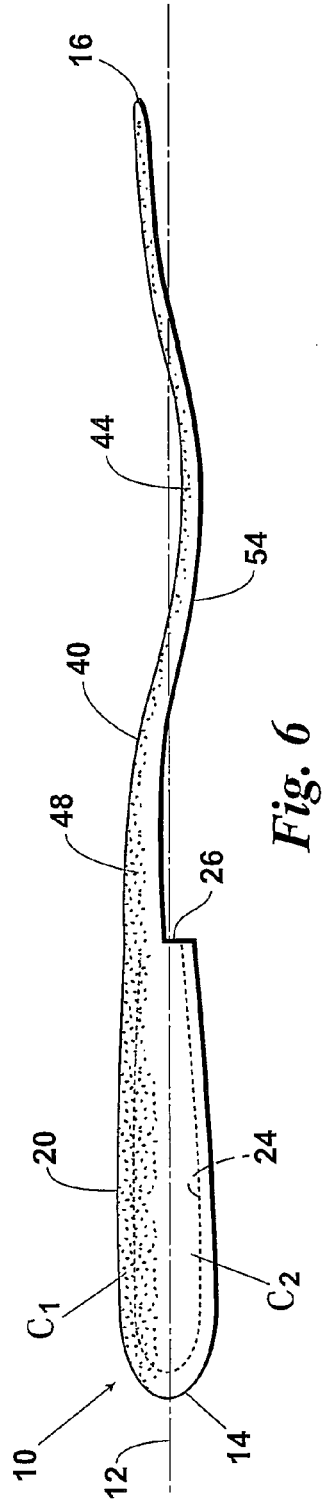

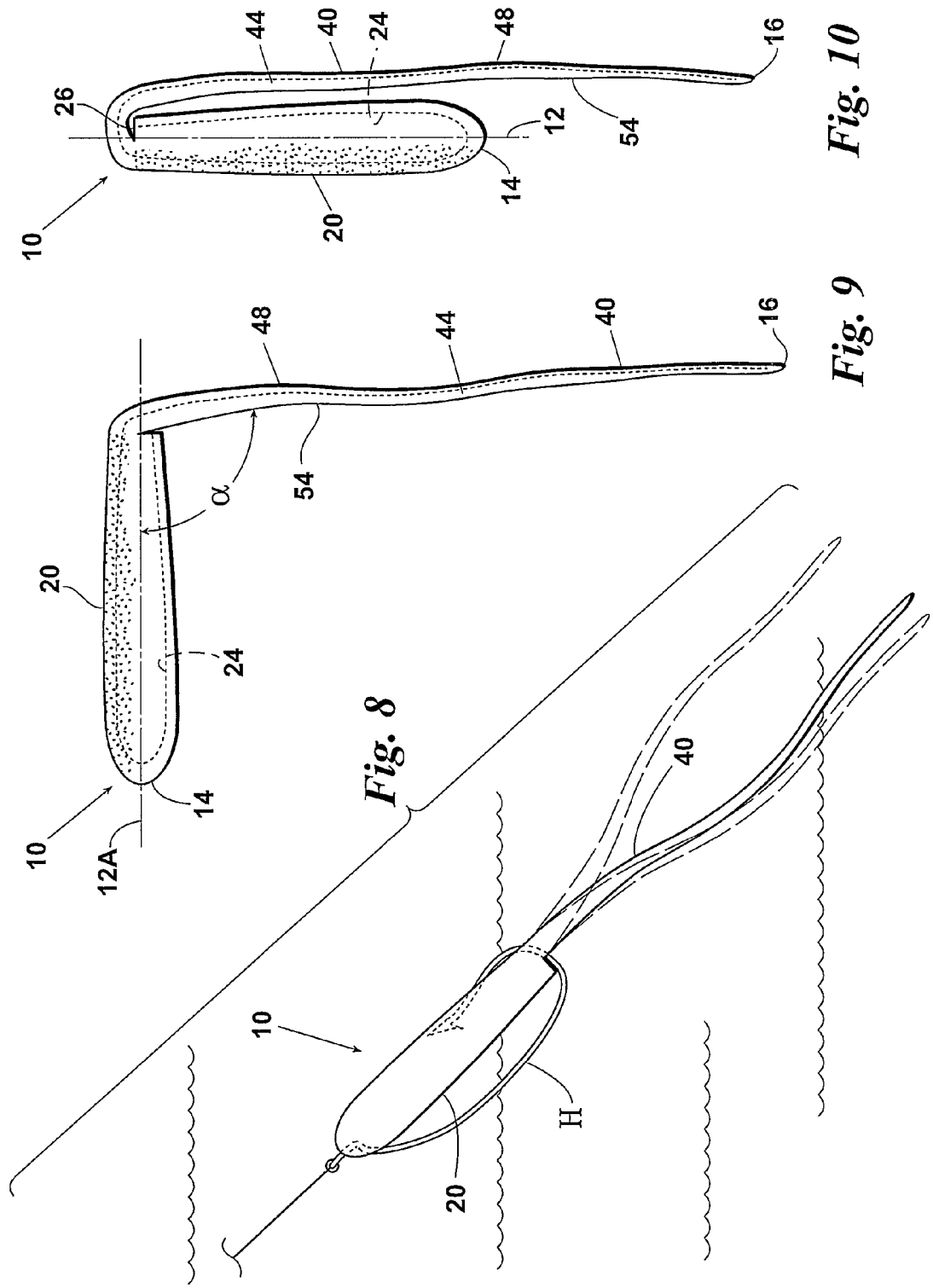

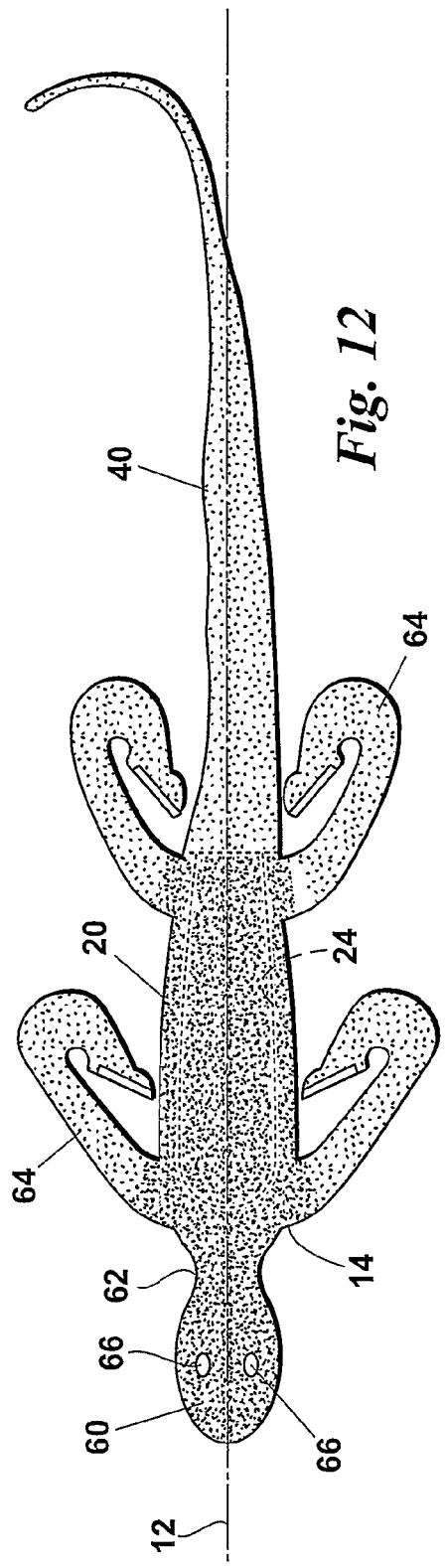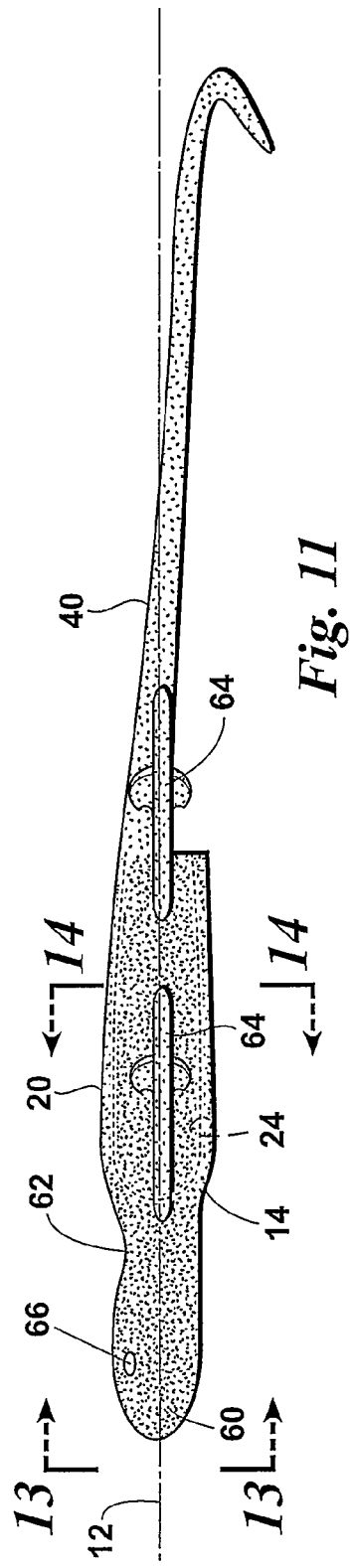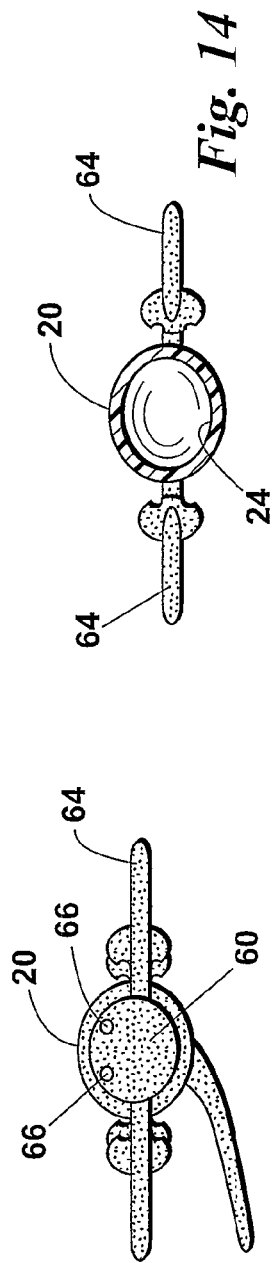

FISHING LURE WITH IMPROVED TAIL

REFERENCE TO PENDING APPLICATIONS

This application is not based upon any pending domestic or international patent applications.

BACKGROUND OF THE INVENTION

This invention relates to fishing lures and, more particularly, to soft plastic lures. Various soft plastic lures have been designed for attracting fish, including worm and tube bait lures. When using a worm or a tube, it is desirable that the lure have the appropriate action in the tail or skirt portion to give the lure a "lifelike" appearance. Known tail portion shapes for worm lures include flat ribbons, concentric arcs, and coils. While current worm and tube designs provide action of one kind or another, the action is not continuous because of the tail's or skirt's inability to capture water in an effective manner. Furthermore, whatever action is achieved is very much dependent on the type of rigging, the weighting, how the lure is fished, and the skill level of the angular. A need exists for a versatile, soft plastic, worm/tube-type lure which provides constant tail action regardless of skill level or how the lure is rigged, weighted and fished.

BRIEF SUMMARY OF THE INVENTION

A fishing lure according to this invention is a worm/tube hybrid lure that includes a body portion and a tail portion integrally formed of soft plastic. The body portion is a tubular body that is closed at its forward end and may have a taper along its length. The hollow interior portion of the body portion is preferably arranged concentric to the body portion. The tail portion is elongated relative to the body portion and concave-shaped in cross-section. The concave-shaped cross section helps capture water and gives the tail a more "lifelike" appearance.

The concave cross-sectional area may be arcuate-shaped, with the difference in thickness of material at its apex (the top of the tail portion) and at its lower edge increasing as the tail portion extends away from the body portion. When molded, the forward end of the tail forms about a 90° angle to the rearward end of the body portion. The lower edges of the tail portion, when molded, form a right angle to the rearward end of the body portion and run substantially parallel to the central longitudinal axis of the body portion. The height at the forward end of the tail portion is substantially half the height of the rearward end of the body portion. The tail portion is also highly flexible and tapered. When the fishing lure is completely out of a body of water, the lower edges of the tail portion form substantially a right angle to the body portion when the body portion is horizontally oriented. Similarly, the lower edges of the tail portion run substantially parallel to the central longitudinal axis of the body portion the body portion is vertically oriented with its forward end down. The width and the height of the tail portion decreases in a substantially uniform manner as the tail portion extends away from the body portion.

The fishing lure may also include be a laminated, two-color lure, with the top color forming at least one stripe running along the centerline of the tail portion. The stripe may also have a taper that substantially parallels the tapered width of the tail portion. Different color flake-like portions may be added to the top or bottom color in order to provide for additional contrast.

A head portion, as well as appendages, may be added to the fishing lure. The head portion and appendages are integrally formed to the body portion. The shape of the head portion and the appendages depends on the live bait to be imitated. For example, the appendages may be amphibian-, crustacean-, reptilian-, and insect-type appendages.

A better understanding of the invention will be obtained from the following detailed description of the preferred embodiments taken in conjunction with the drawings and the attached claims.

BRIEF DESCRIPTION OF THE DRAWINGS

FIG. 1 is a side view of the fishing lure when formed. The body portion of the lure is a tubular body. The tail portion—integrally formed with the body portion and having a concave cross-sectional area (see FIGS. 2 & 3)—is elongated and flexible. The height of the tail portion decreases from its forward to rearward end and, at its forward end, is substantially less than the height of the body portion. The lower edge of the tail portion runs substantially parallel to the centerline of the lure.

FIGS. 2A to 2C are views of the fishing lure taken along section lines 2A-2A, 2B-2B, and 2C-2C of FIG. 1 and showing the concave cross-sectional area of the tail. The concave cross-sectional area of the tail is effective for capturing water and creating lifelike action regardless of how the lure is rigged and fished. The tail has a greater thickness at the top (or back) of the lure than in the lower portion of the sides.

FIG. 3 is a view of the fishing lure taken along section line 3-3 of FIG. 1 again showing the concave cross-sectional area of the tail as well as the opening to the hollow interior of the body portion.

FIG. 4 is a view of the fishing lure taken along section line 4-4 of FIG. 1. The hollow interior of the body portion is substantially concentric to the body portion. The hollow interior may also be positioned off center in a vertical plane relative to the central longitudinal axis of the lure.

FIG. 5 is a top view of the fishing lure when formed. Both the body and the tail portion have a substantially uniform taper from the forward to the rearward end of the lure.

FIG. 6 is a side view of the fishing lure as it might appear in a body of water. The concave cross-sectional area of the tail portion (see FIGS. 2 & 3) creates an undulating effect as it captures water.

FIG. 7 is a top view of a dual-colored, soft plastic, fishing lure as it might appear in a body of water being fished. The lure includes a stripe substantially centered along its longitudinal axis that is of the same color as that of the body portion. As the concave area captures water at various points along the length of the tail portion, the sides and lower edges of the tail portion fan out and in accordingly, creating a quiver-type, amoeba-like effect.

FIG. 8 is a view of the fishing lure after it has received a hook.

FIGS. 9 and 10 are views of the fishing lure illustrating the flexible tail portion.

FIG. 11 is a side view of a lizard-type embodiment of the fishing lure. A head portion and appendages are integrally formed to the body portion.

FIG. 12 is a top view of the lizard embodiment as it might appear in a body of water.

FIG. 13 is a view of the forward end of the lizard embodiment as taken along section line 13-13 of FIG. 12.

FIG. 14 is a cross-sectional view of the lizard embodiment taken along section line 14-14 of FIG. 12. The body and head portion each have a hollow interior. The appendages are substantially centered in a horizontal plane relative to the central longitudinal axis of the body portion.

DETAILED DESCRIPTION OF THE PREFERRED EMBODIMENTS

Referring now to FIGS. 1 to 5, a hybrid worm/tube fishing lure 10 includes a body portion 20 and an elongated, spear-like tail portion 40. Lure 10 is integrally formed of soft plastic so that the rearward end 22 of body 20 is essentially the forward end 42 of tail 40. Body 20 and tail 40 are preferably tapered so that lure 10 has greater height H and width W at its forward end 14 than at its rearward end 16. For example, in a preferred embodiment, tail 40 has a height $H_T$ of 0.1875 inches and a width $W_T$ of 0.375 inches at forward end 42 and a height $H_T$ of 0.050 inches and a width $W_T$ of 0.109 inches at rearward end 16. The maximum height $H_T$ of tail 40 is less than the minimum height $H_B$ of body 20. Except at the point 22, 42 where body 20 meets tail 40, the maximum width $W_T$ of tail 40 is less than the minimum width $W_B$ of body 20.

More importantly, tail 40 is concave-shaped to help capture water while lure 10 is being fished, giving tail 40 more lifelike action regardless of how lure 10 is being fished. For example, lure 10 can be walked on the surface as a topwater lure, jerked below the surface like a jerkbait or fished via Texas or Carolina rig and yet still provide lifelike action, even when let alone by the fisherman. In a preferred embodiment, tail 40 has an arcuate-shaped lower surface 58.

Body 20 is preferably a closed-end tubular body having a hollow interior portion 24 and opening 26. A tube jig (see, for example, FIG. 8, showing lure 10 with hook H) may be placed inside interior portion 24, which allows tail 40 to dance as lure 10 is hopped over the water bottom. A styrofoam "peanut (not shown) may also be placed inside interior portion 24 in order to allow lure 10 to float. Preferably, interior portion 24 is concentric to the central longitudinal axis 12 of lure 10. Alternatively, hollow interior portion 24 may be centered relative to central longitudinal axis 12 in the horizontal plane and offset in the vertical plane.

In a preferred embodiment, body 20 is tapered in height $H_B$ and width $W_B$, having a maximum width $W_B$ of 0.500 inches and a length L1 of 1.6 inches. Fishing lure 10 has an overall length L2 of 5.500 inches and hollow interior portion 34 has a diameter D of 0.225 inches. (Tail 40 has a length L2 minus L1.) In another preferred embodiment, body 20 has a maximum width $W_B$ of 0.590 inches and a length L1 of 5.2875 inches, fishing lure 10 has an overall length L2 of 7.85 inches, and hollow interior portion 34 has a diameter D of 0.250 inches. Tail 40 has sides 44 and 46 with lower edges 54 and 56, respectively. In a preferred embodiment, lower edges 54 and 56, when formed, run substantially parallel to central longitudinal axis 12 and, at forward end 42, forms substantially a right angle to the rearward portion 22 of body 20. Preferably, the height $H_T$ of tail 40 at its forward end 42 is approximately half the height $H_B$ of body. Lower edges 54 and 56 may also form an angle with respect to central longitudinal axis 12. For example, lower edges 54 and 56 may start at forward end 42 slightly below central longitudinal axis 12 and then angularly extend upward, ending slightly above central longitudinal axis 12 at rearward end 16.

Sides 44 and 46 form an apex 50 at the top 48 (back of lure 10) of tail 40 and taper in thickness T away from apex 50 and toward their respective lower edges 54, 56. Tail 40, therefore, has greater thickness T at the apex 50 of the concave cross-section than at the lower edges 54, 56. In a preferred embodiment, the thickness T of apex 50 remained substantially constant along the length of tail 40. The arcuate-shape 58 of tail 40 works in combination with the above geometry to produce an undulating motion as the tail 40 captures water. (See FIGS. 6 & 8.) A side-to-side motion (not shown) may also be produced. Additionally, as the relatively thin lower portions of sides 44 and 46 capture water, a quivering, amoeba-like, or breathing effect is produced by tail 40. (See FIG. 7.) Because of the above configuration of tail 40, tail 40 substantially never stops moving regardless of the skill of the angular or how the lure is rigged, weighted and fished.

Referring now to FIGS. 6 and 7, lure 10 may be a single color C1 and distinguished by using a different color of flake 60 in the soft plastic formulation. Alternatively, lure 10 may be "laminated" in which two colors of soft plastic, C1 and C2, are injected at the same time during manufacturing to create both a top color C1 and a bottom color C2. The laminated two-color scheme C1 and C2 may provide for a stripe 70 on the top of tail 40 that preferably substantially parallels the taper of tail 40 and extends to rearward end 16. By providing a stripe 70 of contrasting color Cl to tail 40, tail 40 is more easily contrasted with the surrounding background, making lure 10 more easily seen by a fish. A different color flake 60 may be added to further distinguish the two-color lure 10. Referring now to FIGS. 9 and 10, the tail 40 is highly flexible. When the fishing lure is completely out of the water, the lower edge 54 (and also lower edge 56, not shown) of tail 40 forms substantially a right angle α to the central longitudinal axis 12 of body 20 when body 20 is oriented at about 180° in the horizontal plane. Similarly, the lower edges 54 and 56 hang substantially parallel to the central longitudinal axis 12 when body 12 is oriented forward end 14 down at about 90° in the vertical plane.

Referring to FIGS. 11 to 14, a lizard-type embodiment of fishing lure 10 includes a hollow head portion 60 formed of soft plastic and integral to body 20. Head 60 may include a narrower neck portion 62 and openings 66. One or more appendages 64 may be added and integrally formed to body 20. In a preferred embodiment, appendages 64 are reptile-type J-shaped appendage and are substantially centered along body 20 in the vertical plane. Various other types and shapes of head 60 may be employed either alone or in combination with amphibian-, crustacean-, reptilian-, and insect-type appendages.

While fishing lure 10 has been described with a certain degree of particularity, many changes may be made in the details of construction and the arrangement of components without departing from the spirit and scope of this disclosure. A fishing lure made according to this disclosure, therefore, is not limited to the embodiments set forth herein for purposes of exemplification, but is limited only by the scope of the attached claims, including the full range of equivalency to which each element thereof is entitled.

What is claimed is:

1. A fishing lure comprising:
 a body portion and a tail portion integrally formed of soft plastic;
 the body portion being a tubular body having a closed end at a forward end of the tubular body and an open end at a rearward end of the tubular body;
 the tail portion having a length, a portion of the length being concave-shaped in cross-section, the concave-shaped cross-sectional area being arcuate-shaped and having a thickness of material at its apex and at its lower edge, a difference between the thickness of material at the apex and at the lower edge decreasing along the length of the tail portion as the tail portion extends away from the body portion.

2. A fishing lure according to claim 1 further comprising the tail portion having a forward end and a lower edge, the lower edge at the forward end of the tail portion intersecting a rearward end of the body portion at about a 90° angle.

3. A fishing lure according to claim 1 further comprising the tail portion having a lower edge along its length, the lower edge being substantially parallel to a central longitudinal axis of the body portion.

4. A fishing lure according to claim 1 further comprising the tail portion and the body portion each having a height, the height at a forward end of the tail portion being substantially half the height of the rearward end of the body portion.

5. A fishing lure according to claim 1 further comprising the tail portion being flexible.

6. A fishing lure according to claim 5 further comprising a lower edge of the tail portion forming substantially a right angle to the body portion when the fishing lure is completely out of a body of water and the body portion is oriented at about 180° in a horizontal plane.

7. A fishing lure according to claim 5 further comprising a lower edge of the tail portion being substantially parallel to a central longitudinal axis of the body portion when the fishing lure is completely out of a body of water and the body portion is oriented forward end down at about 90° in a vertical plane.

8. A fishing lure according to claim 1 further comprising the tail portion having a width and a height, at least one of the width and the height decreasing in a substantially uniform manner along the length of the tail portion as the tail portion extends away from the body portion.

9. A fishing lure according to claim 1 further comprising a hollow interior portion of the body portion being concentric to the body portion.

10. A fishing lure according to claim 1 further comprising a first color and a second color.

11. A fishing lure according to claim 10 further comprising the first color forming substantially at least one stripe on the tail portion.

12. A fishing lure according to claim 11 further comprising the stripe running substantially along a centerline of the tail portion.

13. A fishing lure according to claim 11 further comprising the stripe having a taper, the taper substantially paralleling a tapered width of the tail portion.

14. A fishing lure according to claim 10 further comprising one or more flake-like portions, the flake-like portions being in contrast to at least one of the first and second colors.

15. A fishing lure according to claim 1 further comprising the body portion having a taper along at least one of a length and a width of the body portion.

16. A fishing lure according to claim 1 further comprising the body portion having a first length, the fishing lure having a second length, the second length being in a range of 3 inches to 12 inches.

17. A fishing lure according to claim 16 further comprising the first length being in a range of 29% to 32% of the second length.

18. A fishing lure according to claim 1 further comprising the tail portion having a first height and a second height, the second height being in a range of 17% to 27% of the first height.

19. A fishing lure according to claim 1 further comprising a head portion, the head portion being integrally formed to the body portion.

20. A fishing lure according to claim 1 further comprising one or more appendages integrally formed to the body portion.

* * * * *